US012000299B1

(12) United States Patent
Copeland

(10) Patent No.: US 12,000,299 B1
(45) Date of Patent: Jun. 4, 2024

(54) CENTRIFUGALLY OPERATED OIL SHIELD FOR LUBRICATION FLOW CONTROL

(71) Applicant: Rolls-Royce Corporation, Indianapolis, IN (US)

(72) Inventor: Andrew D. Copeland, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/238,267

(22) Filed: Aug. 25, 2023

(51) Int. Cl.
*F01D 25/18* (2006.01)
*F01D 25/16* (2006.01)

(52) U.S. Cl.
CPC ........... *F01D 25/183* (2013.01); *F01D 25/16* (2013.01); *F05D 2240/50* (2013.01); *F05D 2260/98* (2013.01)

(58) Field of Classification Search
CPC .... F01D 25/183; F01D 25/16; F05D 2240/50; F05D 2260/98
See application file for complete search history.

(56) References Cited

U.S. PATENT DOCUMENTS 2,861,421 A 11/1958 Hockert et al.
4,995,620 A * 2/1991 Zawaski .............. F16J 15/3464 277/377
5,201,835 A * 4/1993 Hosie ...................... E21B 33/03 277/625
6,131,914 A 10/2000 Proveaux
6,921,079 B2 * 7/2005 Rensch .................... F16J 15/42 277/428
6,996,968 B2 2/2006 Peters et al.
8,444,153 B2 * 5/2013 Gaebler ................. F16J 15/162 277/412
8,992,090 B1 3/2015 Mills
9,777,595 B2 10/2017 Sheridan et al.
9,915,175 B2 3/2018 Miller et al.
10,247,036 B2 4/2019 Do et al.
10,527,098 B1 1/2020 Lighty et al.
10,598,035 B2 * 3/2020 Snow .................... F01D 25/183
11,199,103 B2 * 12/2021 Wolfer .................. F01D 11/025
11,209,086 B2 * 12/2021 Davis ................... F16J 15/3492
11,236,636 B2 2/2022 Amador et al.
11,255,272 B2 2/2022 James
11,286,990 B2 3/2022 Davis et al.
11,401,833 B2 8/2022 Davis et al.
11,549,443 B2 1/2023 Baker-Ostiguy et al.
2004/0179935 A1 * 9/2004 Maguire ............. F16C 33/6677 415/111
2015/0014937 A1 * 1/2015 Behrman ............... F16J 15/164 277/351
2017/0234222 A1 8/2017 Schwendenmann
2018/0291960 A1 10/2018 Anglin et al.
2019/0211700 A1 * 7/2019 Munson ............... F16J 15/3284

* cited by examiner

*Primary Examiner* — Jesse S Bogue
(74) *Attorney, Agent, or Firm* — Barnes & Thornburg LLP

(57) ABSTRACT

A rotor assembly includes an oil jet assembly, an inner shaft assembly, an outer shaft assembly, and an oil mist shield. The oil jet assembly selectively ejects oil for lubrication. The inner shaft assembly is configured to rotate about a central axis. The outer shaft assembly is configured to rotate selectively about the central axis independent of the inner shaft assembly. The oil mist shield is coupled with the outer shaft and is configured to selectively block and allow the oil from the oil jet assembly from passing into a cavity.

20 Claims, 6 Drawing Sheets

CENTRIFUGALLY OPERATED OIL SHIELD FOR LUBRICATION FLOW CONTROL

FIELD OF THE DISCLOSURE

The present disclosure relates generally to gas turbine engines, and more specifically to rotor seal assemblies adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, fuel is mixed with the high-pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include a rotor coupling the turbine with the compressor and/or to a fan, propeller, etc. Lubricating fluids may be applied to the rotor bearings to prevent wear and reduce heat. The lubricating fluids are often sprayed toward the bearings, onto the shaft, and/or into cavities housing the bearings and shaft. As a result, the lubricating fluids may be flung or may become an oil-air mist that travels toward other areas of the gas turbine engine. In some examples, gas turbine engines may use seals to prevent lubricating fluids from reaching other components within the gas turbine engine and prevent accumulation of the lubricating fluid.

SUMMARY

The present disclosure may comprise one or more of the following features and combinations thereof.

A rotor assembly may comprise an oil jet assembly, an inner shaft assembly, an outer shaft assembly, and an oil mist shield. The oil jet assembly may extend radially inward toward a central axis and may be configured to selectively eject oil for lubrication. The inner shaft assembly may be configured to rotate about the central axis. The inner shaft assembly may include an inner shaft and an inner bearing coupled with the inner shaft. The inner bearing may be configured to be lubricated by the oil from the oil jet assembly.

In some embodiments, the outer shaft assembly may be configured to rotate selectively about the central axis independent of the inner shaft assembly. The outer shaft assembly may have an outer shaft and an outer bearing. The outer shaft may be arranged radially outward of and circumferentially around the inner shaft to define a cavity radially therebetween. The outer bearing may be coupled with the outer shaft and may be configured to be selectively lubricated by the oil from the oil jet assembly.

In some embodiments, the oil mist shield may be coupled with the outer shaft and configured to selectively block and allow the oil from the oil jet assembly from passing between the inner shaft and the outer shaft and into the cavity. The oil mist shield may be located axially between the inner bearing and the outer bearing. The oil mist shield may include a mount band and a conical lip. The mount band may extend circumferentially around the central axis and may be coupled with the outer shaft. The conical lip may extend radially inward from the mount band to a terminal end. The conical lip may be formed to include a plurality of slits arranged circumferentially around the conical lip. The plurality of slits may extend radially into the conical lip from the terminal end and toward the mount band.

In some embodiments, the oil mist shield may move between a first arrangement and a second arrangement. The first arrangement may be in which the terminal end of the conical lip confronts the inner shaft in response to the outer shaft not rotating about the central axis to block the oil from the oil jet assembly from passing between the outer shaft and the inner shaft to the cavity and the outer bearing. The second arrangement may be in which the terminal end of the conical lip moves radially outward away from the inner shaft in response to the outer shaft rotating about the central axis to allow the oil from the oil jet assembly to pass between the outer shaft and the inner shaft to the cavity to lubricate the outer bearing.

In some embodiments, the conical lip may include a mount end, the terminal end, and a lip body. The mount end may be coupled with the mount band. The terminal end may be opposite the mount end. The lip body may extend therebetween. The mount end may have a first axial thickness. The lip body may have a second axial thickness. The terminal end may have a third axial thickness. The first axial thickness may be greater than the second axial thickness. The third axial thickness may be greater than the second axial thickness.

In some embodiments, the conical lip may extend radially inward and axially forward from the mount band of the oil mist shield toward the inner shaft. A first gap may be formed between the terminal end of the conical lip and the inner shaft in response to the oil mist shield being in the first arrangement and the outer shaft not rotating. A second gap may be formed between the terminal end of the conical lip and the inner shaft in response to the oil mist shield being in the second arrangement and the outer shaft rotating. The first gap may be less than the second gap.

In some embodiments, the rotor assembly further comprises a controller configured to rotate the outer shaft about the central axis. The controller may be configured to direct the oil from the oil jet assembly toward the outer bearing and the inner bearing in response to receiving a first signal. The controller may be configured to stop rotating the outer shaft and stop directing the oil from the oil jet assembly toward the outer bearing while maintaining direction of the oil toward the inner bearing in response to receiving a second signal.

In some embodiments, the oil jet assembly may include an inner bearing jet and an outer bearing jet. The inner bearing jet may extend radially inward and axially aft to direct the oil toward the inner bearing. The outer bearing jet may be arranged axially forward of the inner bearing jet and may extend radially inward and axially forward to direct the oil toward the outer bearing.

In some embodiments, the rotor assembly may further comprise a controller configured to rotate the inner shaft about the central axis and direct the oil from the inner bearing jet toward the inner bearing in response to receiving a first signal. The controller may be configured to rotate the outer shaft about the central axis and direct the oil from the outer bearing jet toward the outer bearing in response to receiving a second signal. The controller may be configured to stop rotating the outer shaft and stop directing the oil from the outer bearing jet toward the outer bearing in response to receiving a third signal.

In some embodiments, the rotor assembly may further comprise a seal coupled with the inner shaft and arranged in the cavity axially forward of the outer bearing and the oil mist shield. The seal may seal an axially forward end of the cavity. The oil mist shield may block the oil from the oil jet assembly from passing between the inner shaft and the outer shaft and into the cavity in response to the outer shaft not rotating to prevent the oil from collecting around the seal.

According to another aspect of the present disclosure, a rotor seal assembly may comprise a first shaft, a second shaft, and an oil mist shield. The first shaft may extend circumferentially about an axis and may be configured to rotate about the axis. The second shaft may be arranged circumferentially around the first shaft to define a cavity radially between the first shaft and the second shaft. The second shaft may be configured to rotate about the axis independent of the first shaft. The oil mist shield may be coupled with the second shaft and configured to move between a first arrangement and a second arrangement. The first arrangement may be in which the oil mist shield extends toward the first shaft in response to the second shaft not rotating to block oil from passing between the first shaft and the second shaft and into the cavity. The second arrangement may be in which the oil mist shield moves away from the first shaft in response to the second shaft rotating to allow the oil to pass between the first shaft and the second shaft and into the cavity.

In some embodiments, the oil mist shield may include a mount band and a lip. The mount band may extend circumferentially around the axis and may be coupled with the second shaft. The lip may extend radially inward and axially forward away from the mount band to a terminal end of the lip that confronts the first shaft in response to the second shaft not rotating about the axis.

In some embodiments, the lip may be formed to include a plurality of slits that extend radially into the lip toward the mount band to allow the terminal end of the lip to move radially outward away from the first shaft in response to the second shaft rotating. The lip may be conical shaped.

In some embodiments, the terminal end of the lip may confront the first shaft in response to the oil mist shield being in the first arrangement. The terminal end of the lip may move radially outward away from the first shaft and toward the second shaft in response to the oil mist shield being in the second arrangement.

In some embodiments, a first gap may be formed between the terminal end of the lip and the first shaft in response to the oil mist shield being in the first arrangement and the second shaft not rotating. A second gap may be formed between the terminal end of the lip and the first shaft in response to the oil mist shield being in the second arrangement and the second shaft rotating. The first gap may be less than the second gap.

In some embodiments, the lip may include a mount end, the terminal end, and a lip body. The mount end may be coupled with the mount band. The terminal end may be opposite the mount end. The lip body may extend therebetween. The mount end may have a first axial thickness. The lip body may have a second axial thickness. The terminal end may have a third axial thickness. The first axial thickness may be greater than the second axial thickness. The third axial thickness may be greater than the second axial thickness.

In some embodiments, the oil mist shield may be located radially between the first shaft and the second shaft. The oil mist shield may extend radially inward and axially forward away from the second shaft and toward the first shaft.

In some embodiments, the oil mist shield may block the oil from passing between the first shaft and the second shaft and into the cavity in response to the second shaft not rotating to prevent the oil from traveling toward and collecting around a seal that is coupled with the first shaft and located axially forward of the oil mist shield. The rotor seal assembly may further comprise a controller. The controller may be configured to rotate the first shaft about the central axis and direct the oil toward the first shaft in response to receiving a first signal. The controller may be configured to rotate the second shaft about the central axis and direct the oil toward the second shaft in response to receiving a second signal. The controller may be configured to stop rotating the second shaft and stop directing the oil toward the second shaft in response to receiving a third signal.

A method may comprise rotating a first shaft about an axis. The method may comprise directing oil from a first jet toward a first bearing coupled with the first shaft. The method may comprise blocking the oil from flowing between the first shaft and a second shaft with an oil mist shield in response to the second shaft not rotating about the axis. The method may comprise directing oil from a second jet toward a second bearing coupled with the second shaft in response to a first signal. The method may comprise rotating the second shaft about the axis in response to the first signal to cause a terminal end of the oil mist shield to move away from the first shaft and allow the oil from the first jet and the second jet to flow between the first shaft and the second shaft to lubricate the second bearing.

In some embodiments, the method may comprise stopping rotation of the second shaft about the axis in response to a second signal to cause the terminal end of the oil mist shield to move toward the first shaft and block the oil from the first jet from flowing between the first shaft and the second shaft. The method may comprise stopping the direction of oil from the second jet toward the second bearing in response to the second signal.

These and other features of the present disclosure will become more apparent from the following description of the illustrative embodiments.

DETAILED DESCRIPTION

Figure 1:
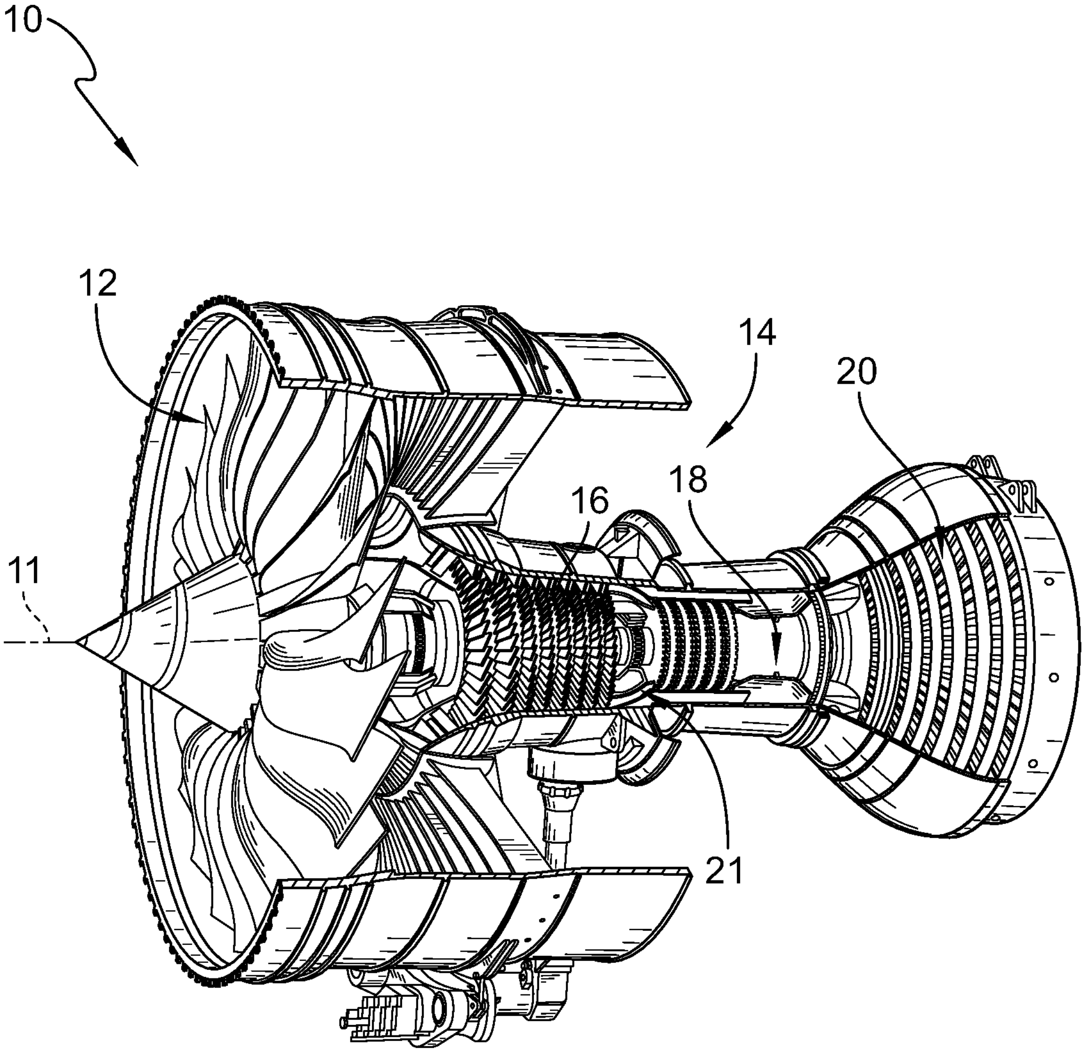
FIG. 1 is a cutaway view of a gas turbine engine that includes an engine core having a compressor, a combustor downstream of the compressor, and a turbine downstream of the combustor, a fan coupled with the engine core and configured to be driven to provide thrust for an aircraft, and further including a rotor assembly configured to selectively block a flow of oil within the gas turbine engine.

For the purposes of promoting an understanding of the principles of the disclosure, reference will now be made to a number of illustrative embodiments illustrated in the drawings and specific language will be used to describe the same.

An illustrative gas turbine engine 10 includes a fan 12 and an engine core 14 having a compressor 16, a combustor 18 located downstream of the compressor 16, and a turbine 20 located downstream of the combustor 18 as shown in FIG. 1. The fan 12 is driven by the turbine 20 and provides thrust for propelling the gas turbine engine 10. The compressor 16 compresses and delivers pressurized air to the combustor 18. The combustor 18 mixes fuel with the compressed air received from the compressor 16 and ignites the fuel. The hot, high-pressure products of the combustion reaction in the combustor 18 are directed into the turbine 20 to cause the turbine 20 to rotate about a central axis 11 and drive the compressor 16 and the fan 12. In other embodiments, the fan 12 is omitted and the turbine 20 drives a shaft to provide rotational energy to a system.

Figure 2:
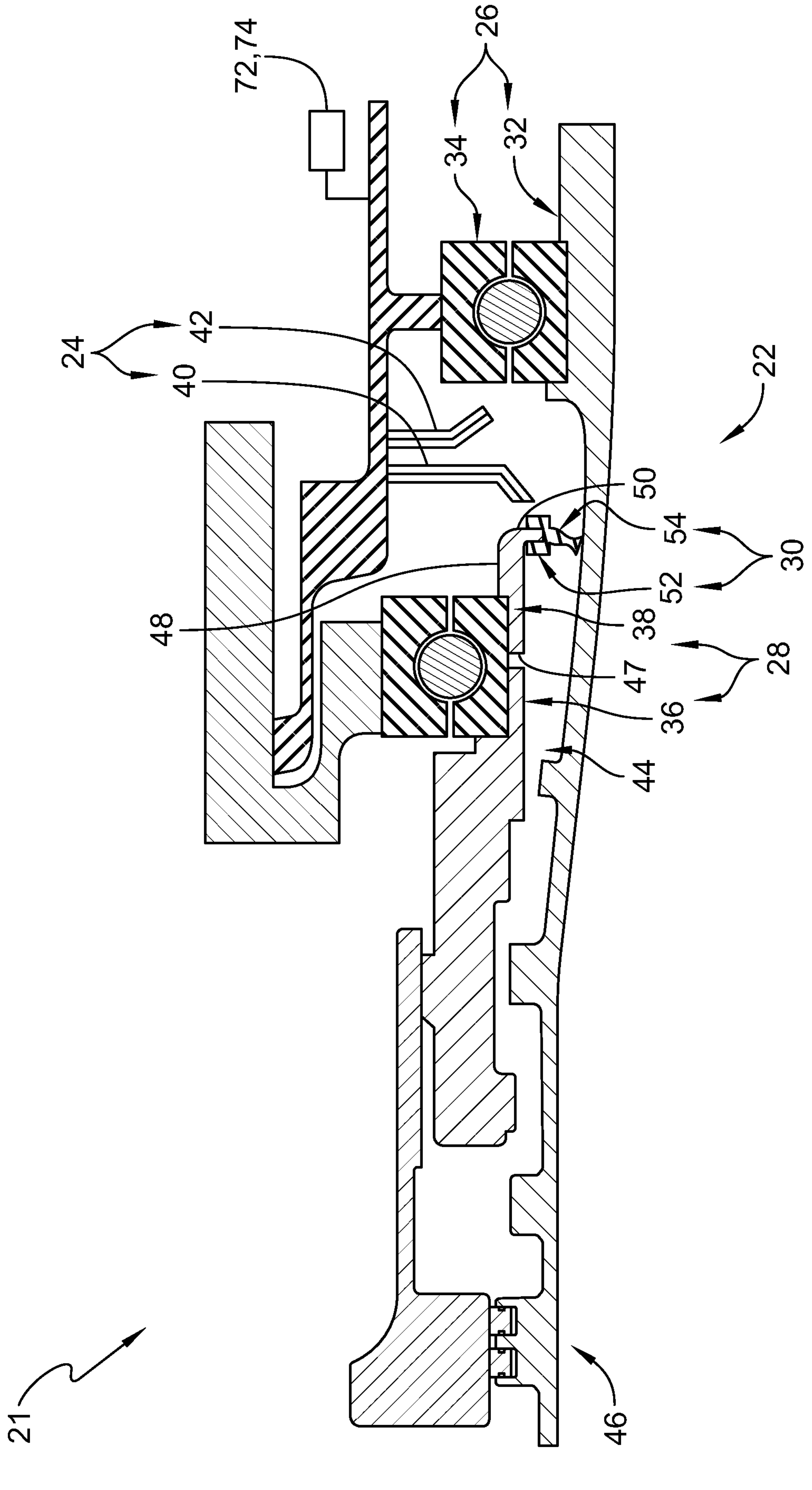
FIG. 2 is a section view of the rotor assembly of FIG. 1, showing an inner shaft assembly having an inner shaft and an inner bearing coupled with the inner shaft that is lubricated by an oil jet assembly, an outer shaft assembly having an outer shaft arranged radially outward of the inner shaft and an outer bearing coupled with the outer shaft, and an oil mist shield coupled with the outer shaft to selectively block the oil from the oil jet assembly from reaching the outer bearing.

The gas turbine engine 10 further includes a rotor assembly 21 arranged within the engine core 14 as shown in FIG. 1. The rotor assembly 21 includes a rotor seal assembly 22, an oil jet assembly 24 configured to selectively eject oil, and a seal 46 as shown in FIG. 2. The rotor seal assembly 22 selectively blocks the oil from the oil jet assembly 24 so that the oil does not accumulate and leak out of the gas turbine engine 10. The oil jet assembly 24 ejects the oil to lubricate various components of the gas turbine engine 10. The seal 46 is arranged axially forward of the oil jet assembly 24. The rotor assembly 21 may be used in a variety of locations with the gas turbine engine 10, along with being used in auxiliary units, gearboxes, lift fan systems, etc. and may also be used with rotor assemblies outside of the field of gas turbine engines. Though described as being included in a gas turbine engine for illustrative purposes, the rotor assembly 21 may be used in any clutch system. As an example, the rotor assembly 21 may be used in a clutch system having at least one shaft that is not rotating during an entirety of the operating time of the clutch system.

The rotor seal assembly 22 includes an inner shaft assembly 26, an outer shaft assembly 28, and an oil mist shield 30 as shown in FIG. 2. The inner shaft assembly 26 is arranged circumferentially about the central axis 11. The outer shaft assembly 28 is arranged circumferentially about the central axis 11 radially outward of the inner shaft assembly 26. The oil mist shield 30 selectively blocks the oil from the oil jet assembly 24 from flowing axially forward into a cavity 44 between the outer shaft assembly 28 and the inner shaft assembly 26 to minimize accumulation of the oil.

The inner shaft assembly 26 includes an inner shaft 32 and an inner bearing 34 as shown in FIG. 2. In the illustrative embodiment, the inner shaft 32 rotates about the axis 11 during an entirety of the operating conditions of the gas turbine engine 10. The inner bearing 34 is coupled with and supports the inner shaft 32.

The outer shaft assembly 28 includes an outer shaft 36 and an outer bearing 38 as shown in FIG. 2. The outer shaft 36 selectively rotates about the axis 11 independent of the rotation of the inner shaft 32. In the illustrative embodiment, the outer shaft 36 rotates about the axis 11 during a portion of the operating time of the gas turbine engine 10. In the illustrative example, the portion of the operating time of the gas turbine engine 10 during which the outer shaft 36 rotates is small relative to the entirety of the operating time, and may be, for example, 5 percent of the operating time.

Figure 6:
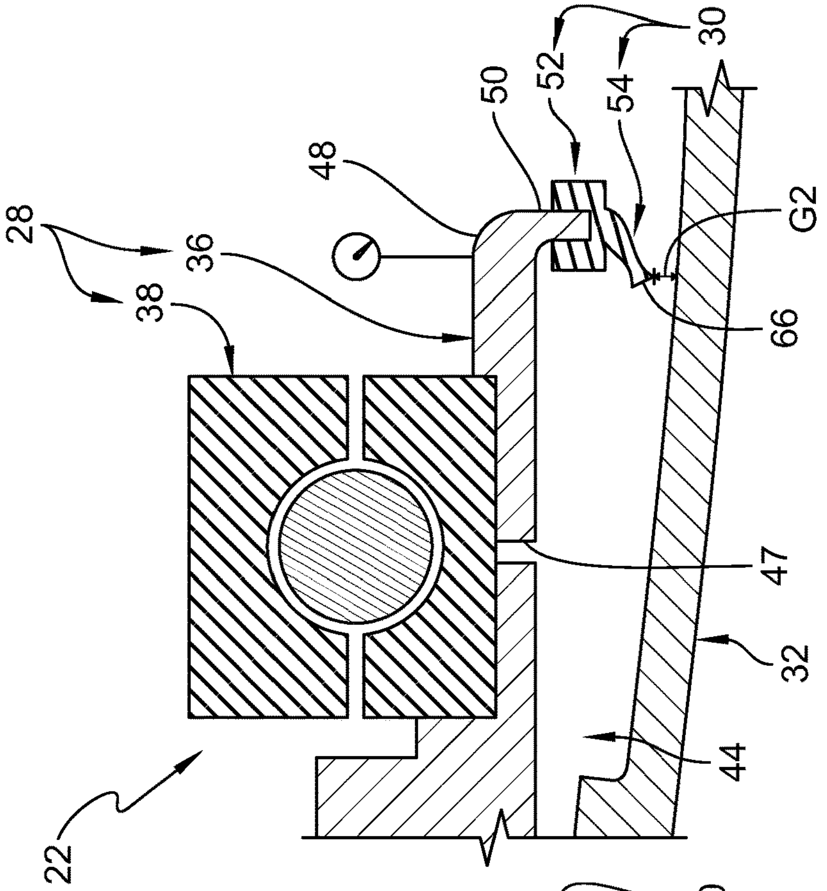
FIG. 6 is an enlarged section view of the rotor assembly of FIG. 2, showing the oil mist shield in a second arrangement in response to the outer shaft rotating in which the terminal end of the conical lip moves radially outward away from the inner shaft and toward the outer shaft to allow oil from the oil jet assembly to pass between the outer shaft and the inner shaft to lubricate the outer bearing.
Figure 5:
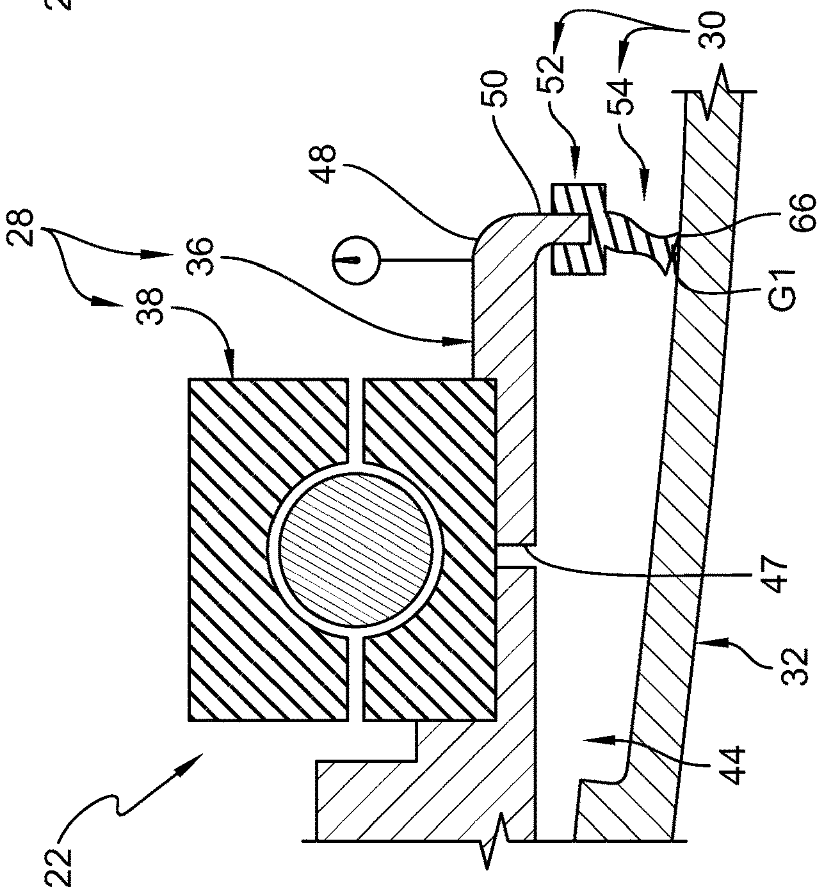
FIG. 5 is an enlarged section view of the rotor assembly of FIG. 2, showing the oil mist shield in a first arrangement in response to the outer shaft not rotating in which the terminal end of the conical lip confronts the inner shaft to block the oil from the oil jet assembly from passing between the outer shaft and the inner shaft and accumulating in the cavity.

In the illustrative embodiment, a clutch is coupled with the outer shaft 36. In response to the clutch being disengaged, the outer shaft 36 does not rotate such that the oil mist shield 30 blocks the splashed oil from flowing between the outer shaft 36 and the inner shaft 32, as shown in FIG. 5. In response to the clutch being engaged, the outer shaft 36 rotates such that the oil mist shield 30 moves radially outward away from the inner shaft 32, as shown in FIG. 6.

The outer shaft 36 is arranged radially outward of the inner shaft 32 to define a cavity 44 radially between the outer shaft 36 and the inner shaft 32. The outer shaft 36 terminates at an aft end 48 located axially between the outer bearing 38 and the inner bearing 34. The aft end 48 is formed to include a flange 50 extending radially inward from the aft end 48 and circumferentially around the axis 11. The outer bearing 38 is coupled with and supports the outer shaft 36. The outer shaft 36 is formed to include a hole 47 extending therethrough and radially aligned with the outer bearing 38 as shown in FIG. 2.

The oil jet assembly 24 includes an outer bearing jet 40 and an inner bearing jet 42 as shown in FIG. 2. Each of the outer bearing jet 40 and the inner bearing jet 42 is formed to include a passage extending therethrough through which the oil flows to selectively lubricate the inner bearing 34 and the outer bearing 38. The oil jet assembly 24 is arranged axially between the outer bearing 38 and the inner bearing 34. The outer bearing jet 40 extends radially inward toward the axis 11 and axially forward toward the outer bearing 38. The outer bearing jet 40 selectively ejects oil toward the outer bearing 38 for lubrication of the outer bearing 38. The inner bearing jet 42 extends radially inward toward the axis 11 and axially aft toward the inner bearing 34 and ejects oil toward the inner bearing 34 for lubrication of the inner bearing 34.

Each of the outer bearing jet 40 and the inner bearing jet 42 are fluidly connected to an oil tank housing the oil therein.

Because the inner shaft 32 is rotating during the entirety of the operation of the gas turbine engine 10, lubrication is directed toward the inner bearing 34 during the entirety of the operating time in the illustrative example. On the other hand, because the outer shaft 36 is only rotating during the portion of the operating time, the outer bearing 38 is lubricated only while the outer shaft 36 is rotating. Thus, the outer bearing 38 may use lubrication during only the portion of the operating time of the gas turbine engine 10.

In response to the inner shaft 32 and the outer shaft 36 rotating, the inner bearing 34 and the outer bearing 38 are subject to friction, and therefore, generate heat. Lubrication of the inner bearing 34 and the outer bearing 38 may help to reduce friction, remove heat, and prevent wear and tear. The inner bearing 34 and the outer bearing 38 may use lubrication in response to the respective bearing 34, 38 being engaged. The flow of the lubricant may be managed to minimize accumulation of the lubricant, and thus, reduce the risk of a leak in the gas turbine engine 10. Though the lubricant is illustratively described as oil, it should be understood that other lubricants may be used.

Due to the operating time of the inner shaft 32, the inner bearing jet 42 may operate and eject oil toward the inner bearing 34 during the entirety of the operation of the gas turbine engine 10. Any excess oil may be pumped out and removed from the area. As the outer shaft 36 rotates during the portion of the operating time of the gas turbine engine 10, the outer bearing jet 40 may operate and eject oil toward the outer bearing 38 only during that portion of the operating time.

While the outer shaft 36 is not rotating, lubrication is not directed toward the outer bearing 38. Thus, while the outer shaft 36 is not rotating, the outer bearing jet 40 is not ejecting oil toward the outer bearing 38. However, some of the oil from the inner bearing jet 42 that is ejected toward the inner bearing 34 may splash off of the inner bearing 34 or the inner shaft 32 and travel axially forward away from the inner bearing 34 and toward the outer bearing 38.

Because the outer shaft 36 may not be rotating, the splashed oil may not be pumped out and removed from the area. Thus, without the oil mist shield 30, the splashed oil may accumulate in the cavity 44 and continue traveling axially forward away from the inner bearing 34 and the outer bearing 38 and toward the seal 46. During operation of the gas turbine engine 10, a pressure in the cavity 44 is greater than a pressure in an adjacent dry cavity axially forward of the seal 46. The pressure difference may urge the splashed oil axially forward such that the splashed oil leaks out of the seal 46 into the adjacent dry cavity. Oil accumulation in the dry cavity may lead to leakage out of the gas turbine engine 10.

To minimize accumulation of the splashed oil in the cavity 44 and leakage of the splashed oil out of the seal 46, the rotor seal assembly 22 includes the oil mist shield 30 as shown in FIG. 2. The oil mist shield 30 moves between a first arrangement, as shown in FIG. 5, in which the splashed oil from the inner bearing jet 42 is blocked from the cavity 44 by the oil mist shield 30, and a second arrangement, as shown in FIG. 6, in which the oil from the outer bearing jet 40 and the splashed oil from the inner bearing jet 42 is not blocked from the cavity 44 and the outer bearing 38. The oil mist shield 30 is arranged to move between the first arrangement and the second arrangement automatically as a result of centrifugal forces in response to rotation of the outer shaft 36.

Figure 4:
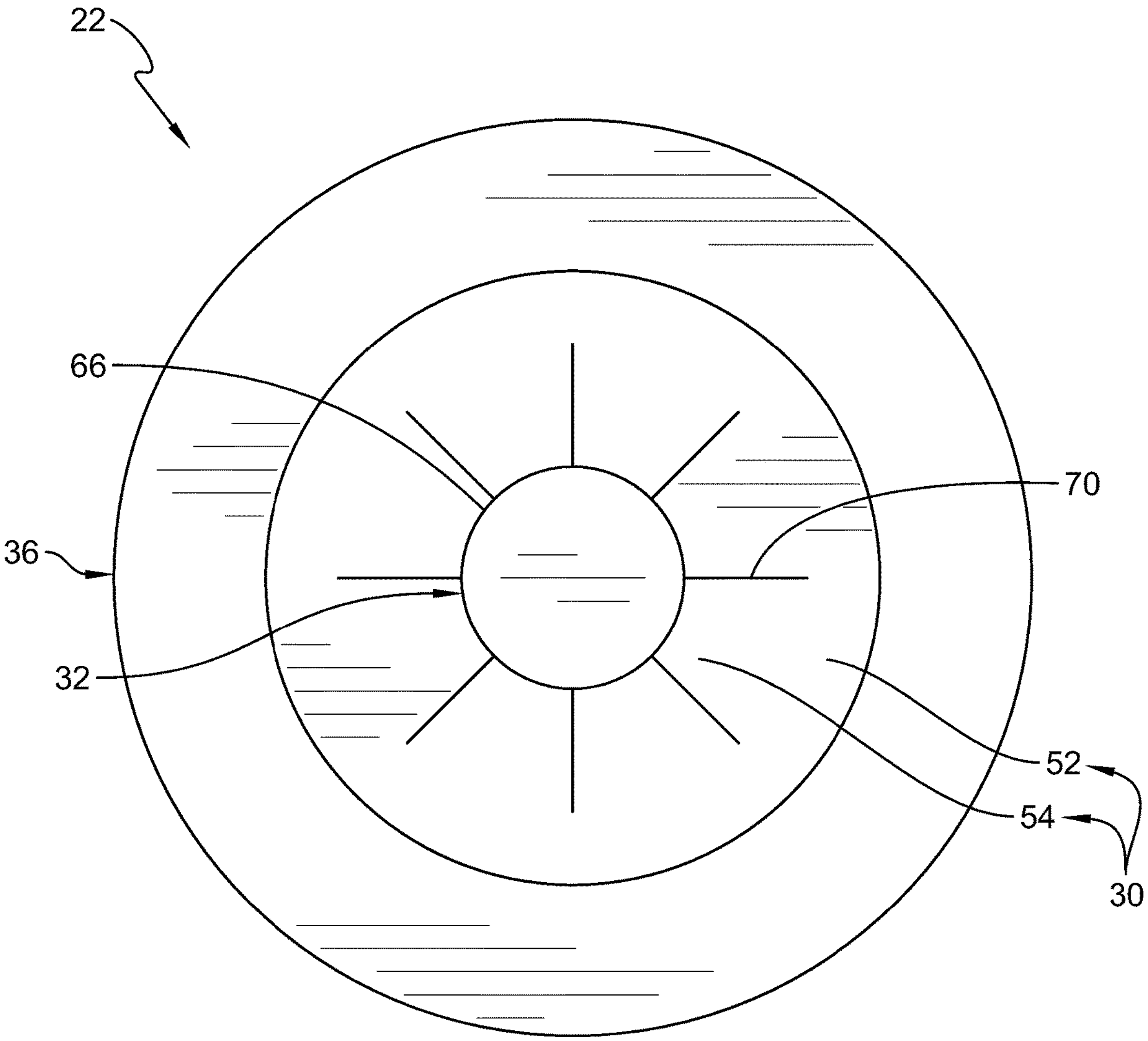
FIG. 4 is an elevation view looking axially forward along the axis, showing the oil mist shield extends circumferentially around the axis and the conical lip of the oil mist shield is formed to include a plurality of slits that allow the conical lip to move radially outward toward the outer shaft and away from the inner shaft, as shown in FIG. 6, so that oil can pass between the outer shaft and the inner shaft to reach the cavity and lubricate the outer bearing.

The oil mist shield 30 is coupled with the outer shaft 36 for rotation about the axis 11 with the outer shaft 36 as shown in FIG. 2. The oil mist shield 30 is located axially between the outer bearing 38 and the inner bearing 34. The oil mist shield 30 extends radially between the outer shaft 36 and the inner shaft 32 to block the splashed oil from flowing between the outer shaft 36 and the inner shaft 32, accumulating in the cavity 44, and potentially leaking out of the seal 46. The oil mist shield 30 extends entirely circumferentially around the inner shaft 32 as shown in FIG. 4

Figure 3:
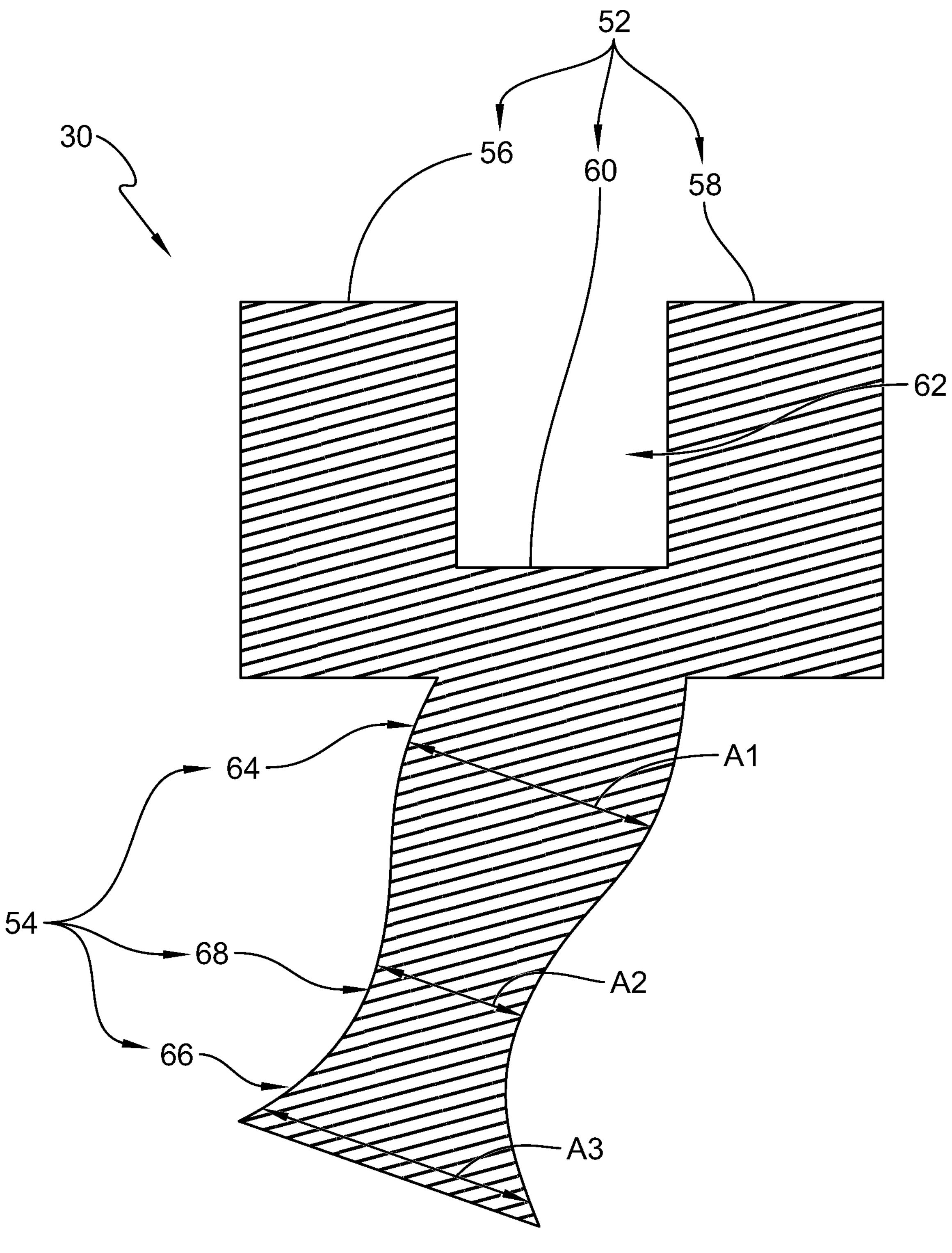
FIG. 3 is a section view of the oil mist shield of FIG. 2, showing the oil mist shield includes a mount band that couples with the outer shaft and a conical lip extending axially forward and radially inward from the mount band, and further showing the conical lip has a tapered axial thickness to increase a mass of a terminal end of the oil mist shield and assist in radial outward movement of the oil mist shield in response to centripetal forces acting on the oil mist shield.

The oil mist shield 30 includes a mount band 52 and a conical lip 54 as shown in FIGS. 2 and 3. The mount band 52 is coupled with the flange 50 of the aft end 48 of the outer shaft 36 in the illustrative embodiment. In other embodiments, the oil mist shield 30 may be coupled with the outer shaft 36 using other attachment means or locations. The conical lip 54 is coupled with the mount band 52 and extends radially inwardly from the mount band 52 toward the inner shaft 32. The oil mist shield 30 extends circumferentially completely around the axis 11 in the illustrative embodiment.

The mount band 52 includes a first member 56, a second member 58 in axially spaced apart relation to the first member 56, and a third member 60 extending axially between and interconnecting the first member 56 and the second member 58 as shown in FIG. 3. The first member 56, the second member 58, and the third member 60 cooperate to form a flange-receiving space 62 to receive the flange 50 of the aft end 48 of the outer shaft 36 therein. In the illustrative embodiment, the mount band 52 is press fit with the outer shaft 36 by pressing the flange 50 into the flange-receiving space 62 so as to couple the mount band 52 with the outer shaft 36.

The conical lip 54 of the oil mist shield 30 includes a mount end 64 coupled with the third member 60 of the mount band 52, a terminal end 66 opposite the mount end 64, and a lip body 68 extending therebetween as shown in FIG. 3. In response to the outer shaft 36 not rotating, the oil mist shield 30 is in the first arrangement, and the terminal end 66 confronts the inner shaft 32 to block the splashed oil from flowing between the outer shaft 36 and the inner shaft 32 as shown in FIG. 5. Because the terminal end 66 confronts the inner shaft 32, the splashed oil is blocked from reaching and accumulating in the cavity 44, thereby preventing oil from leaking out of the seal 46. In some embodiments, the terminal end 66 contacts the inner shaft 32 in the first arrangement. In some embodiments, the terminal end 66 is near, but spaced apart from the inner shaft 32 in the first arrangement to discourage and block lubrication flow.

The conical lip 54 is formed to include a plurality of slits 70 extending circumferentially around the conical lip 54 as shown in FIG. 4. The plurality of slits 70 extend into the conical lip 54 from the terminal end 66 toward the mount band 52. The plurality of slits 70 separates the conical lip 54 into sections and allows the sections of the conical lip 54 to move radially outward away from the inner shaft 32 and toward the outer shaft 36 in response to the outer shaft 36 rotating so that the oil mist shield 30 is in the second arrangement as shown in FIG. 6. In the second arrangement, the oil from the outer bearing jet 40 and splashed oil from the inner bearing jet 42 can flow between the outer shaft 36 and the inner shaft 32 to lubricate the outer bearing 38.

During rotation of the outer shaft 36, the outer bearing 38 may use lubrication. Thus, the outer bearing jet 40 ejects oil toward the outer bearing 38 to provide the lubrication. In the illustrative embodiment, the ejected oil passes through the hole 47 to reach the outer bearing 38. Because the outer shaft 36 is rotating, the oil mist shield 30 is also rotating with the outer shaft 36. Due to the rotation and the plurality of slits 70, the conical lip 54 moves radially outward away from the inner shaft 32 to reach the second arrangement as shown in FIG. 6. The oil from the outer bearing jet 40 is then free to flow between the shifted conical lip 54 and the inner shaft 32. In response to the outer shaft 36 stopping rotation, the oil mist shield 30 also stops rotating about the axis 11. The conical lip 54 then moves radially inwardly toward the inner shaft 32 to the first arrangement as shown in FIG. 5. In some embodiments, the conical lip 54 moves radially outward in response to relatively high outer shaft 36 speeds and moves radially inward to the first arrangement in response to relatively low or no outer shaft 36 speeds.

To aid in the movement of the oil mist shield 30 from the first arrangement to the second arrangement in response to the outer shaft 36 rotating, the conical lip 54 has varied axial thickness. The conical lip 54 tapers in axial thickness from the mount end 64 to the lip body 68 as shown in FIG. 3. Thus, the mount end 64 is thicker than the lip body 68. The conical lip 54 tapers in axial thickness from the terminal end 66 to the lip body 68. Thus, the terminal end 66 is thicker than the lip body 68 to provide a weighted terminal end 66 to allow centrifugal forces to have greater effect in moving the terminal end 66 radially outward. Other geometries are also envisioned and may include relatively large terminal ends 66 like the one shown in FIG. 3 and also constant thickness or tapered thickness conical lips 54.

The mount end 64 of the conical lip 54 has a first axial thickness A1 as shown in FIG. 3. The lip body 68 of the conical lip 54 has a second axial thickness A2. The terminal end 66 of the conical lip 54 has a third axial thickness A3. The first axial thickness A1 is greater than the second axial thickness A2. The third axial thickness A3 is greater than the second axial thickness A2. The third axial thickness A3 of the terminal end 66 being greater than the second axial thickness A2 of the lip body 68 helps move the terminal end 66 away from the inner shaft 32 in response to the outer shaft 36 rotating and the oil mist shield 30 assuming the second arrangement.

Because the third axial thickness A3 of the terminal end 66 is greater than the second axial thickness A2 of the lip body 68, the terminal end 66 has a greater mass than the lip body 68. Thus, the terminal end 66 experiences a greater centrifugal force due to the greater mass, which helps move the terminal end 66 away from the inner shaft 32 in response to the outer shaft 36 rotating.

In one embodiment, the third axial thickness A3 of the terminal end 66 is greater than the first axial thickness A1 of the mount end 64. In some embodiments, the third axial thickness A3 of the terminal end 66 is less than the first axial thickness A1 of the mount end 64. In some embodiments, the third axial thickness A3 of the terminal end 66 is substantially similar to the first axial thickness A1 of the mount end 64.

Figure 7:
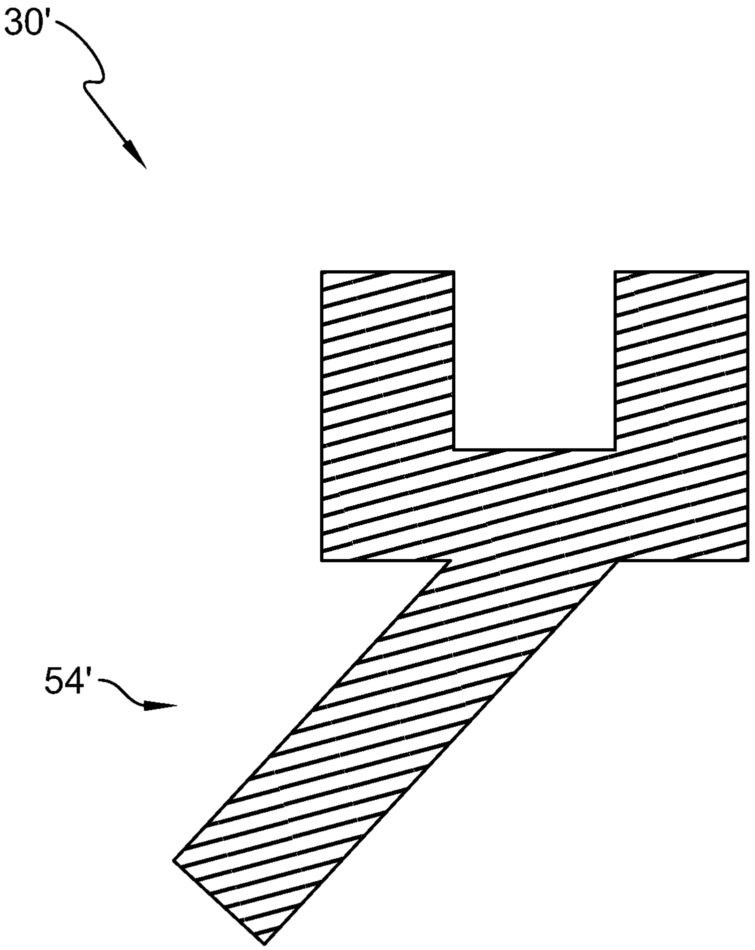
FIG. 7 is a section view of another embodiment of an oil mist shield, showing the oil mist shield includes a mount band that couples with the outer shaft and a conical lip extending radially inward from the mount band, and further showing the conical lip has a substantially constant axial thickness.

An alternative embodiment of an oil mist shield 30' in accordance with the present disclosure is shown in FIG. 7. The oil mist shield 30' is substantially similar to the oil mist shield 30, except that the oil mist shield 30' has an axial thickness that is substantially constant throughout a conical lip 54' of the oil mist shield 30'. In other embodiments, the axial thickness tapers from thick at a radially outer end to thin radially inward at the terminal end 66.

In the first arrangement of the oil mist shield 30, as shown in FIG. 5, a first gap G1 (or no gap in some embodiments) is formed between the terminal end 66 of the conical lip 54 and the inner shaft 32. In the second arrangement of the oil mist shield 30, as shown in FIG. 6, a second gap G2 is formed between the terminal end 66 of the conical lip 54 and the inner shaft 32. The second gap G2 is larger than the first gap G1. The second gap G2 allows the oil to reach the cavity 44, pass through the hole 47 formed in the outer shaft 36, and reach the outer bearing 38, while the first gap G1 prevents the splashed oil from reaching the cavity 44.

In one embodiment, the terminal end 66 abuts the inner shaft 32 in the first arrangement such that the terminal end 66 is adjacent the inner shaft 32 but not contacting the inner shaft 32. In some embodiments, the terminal end 66 contacts the inner shaft 32 in the first arrangement such that the first gap G1 is zero.

In the illustrative embodiment, the oil mist shield 30 is a monolithic component. In the illustrative embodiment, the oil mist shield 30 is made of an elastomer material.

The seal 46 of the rotor assembly 21 is arranged axially forward of the outer bearing 38, the oil mist shield 30, and the oil jet assembly 24 as shown in FIG. 2. The seal 46 is located radially between the inner shaft 32 and the outer shaft 36 to seal the cavity 44 axially forward of the oil mist shield 30. In the illustrative embodiment, the seal 46 is a piston ring seal. In some embodiments, other types of seals may be used to seal the axially forward end of the cavity 44.

The rotor assembly 21 further includes a controller 72 that selectively controls rotation of the outer shaft 36, rotation of the inner shaft 32, and the flow of the oil from the oil jet assembly 24 as shown in FIG. 2. In response to receiving a first signal, the controller 72 rotates the inner shaft 32 about the axis 11 and ejects the oil from the inner bearing jet 42 toward the inner bearing 34. The first signal may indicate operation of the gas turbine engine 10. Thus, while the inner shaft 32 is rotating, which is during the entirety of the operating time of the gas turbine engine 10, the controller 72 operates the inner bearing jet 42 so that the oil is directed toward the inner bearing 34. In the illustrative embodiment, the first signal may be a start of operation of the gas turbine engine 10 such that the inner shaft 32 is rotating and the inner bearing jet 42 is ejecting oil during operation of the gas turbine engine 10.

In response to receiving a second signal, the controller 72 rotates the outer shaft 36 about the axis 11 and ejects the oil from the outer bearing jet 40 toward the outer bearing 38. Thus, while the outer shaft 36 is rotating, which is during the portion of the operating time of the gas turbine engine 10, the controller 72 operates the outer bearing jet 40 so that the oil is directed toward the outer bearing 38.

In response to receiving a third signal, the controller 72 stops rotation of the outer shaft 36 about the axis 11 and stops ejecting oil from the outer bearing jet 40 toward the outer bearing 38. In response to the third signal, the controller 72 maintains rotation of the inner shaft 32 and maintains ejection of oil from the inner bearing jet 42 toward the inner bearing 34. Thus, while the outer shaft 36 is not rotating, the controller 72 operates the outer bearing jet 40 so that the oil is not directed toward the outer bearing 38 from the outer bearing jet 40.

The signals may be generated manually by a pilot or may be automatically generated based on an operating condition of the gas turbine engine 10, an external condition, or a combination of such. The operating condition may include at least one of take-off, climb, cruise, descent, and landing of an aircraft having the gas turbine engine 10.

In some embodiments, the controller 72 includes at least one sensor 74 configured to take real-time measurements as shown in FIG. 2. The real-time measurements may include a flow of the oil from the outer bearing jet 40, a flow of the oil from the inner bearing jet 42, a speed of rotation of the outer shaft 36, and a speed of rotation of the inner shaft 32. The real-time measurements may be used in order to determine the operating condition of the gas turbine engine 10.

A method of using the rotor assembly 21 is described below. The method includes rotating the first shaft 32 about the axis 11. The method includes directing oil from the first jet 42 toward the first bearing 34 coupled with the first shaft 32. The method includes blocking the oil from flowing between the first shaft 32 and the second shaft 36 with the oil mist shield 30 in response to the second shaft 36 not rotating about the axis 11. The method includes directing oil from the second jet 40 toward the second bearing 38 coupled with the second shaft 36 in response to the first signal. The method includes rotating the second shaft 36 about the axis 11 in response to the first signal to cause the terminal end 66 of the oil mist shield 30 to move away from the first shaft 32 and allow the oil from the first jet 42 and the second jet 40 to flow between the first shaft 32 and the second shaft 36 to lubricate the second bearing 38.

The method includes stopping rotation of the second shaft 36 about the axis 11 in response to the second signal to cause the terminal end 66 of the oil mist shield 30 to move toward the first shaft 32 and block the oil from the first jet 42 from flowing between the first shaft 32 and the second shaft 36. The method includes stopping the direction of oil from the second jet 40 toward the second bearing 38 in response to the second signal.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A rotor assembly comprising:

an oil jet assembly extending radially inward toward a central axis and configured to selectively eject oil for lubrication, an inner shaft assembly configured to rotate about the central axis, the inner shaft assembly including an inner shaft and an inner bearing coupled with the inner shaft and configured to be lubricated by the oil from the oil jet assembly, an outer shaft assembly configured to rotate selectively about the central axis independent of the inner shaft assembly, the outer shaft assembly having an outer shaft arranged radially outward of and circumferentially around the inner shaft to define a cavity radially therebetween and an outer bearing coupled with the outer shaft and configured to be selectively lubricated by the oil from the oil jet assembly, and an oil mist shield coupled with the outer shaft and configured to selectively block and allow the oil from the oil jet assembly from passing between the inner shaft and the outer shaft and into the cavity, the oil mist shield located axially between the inner bearing and the outer bearing, the oil mist shield including a mount band that extends circumferentially around the central axis and is coupled with the outer shaft and a conical lip that extends radially inward from the mount band to a terminal end, the conical lip is formed to include a plurality of slits arranged circumferentially around the conical lip and that extend radially into the conical lip from the terminal end and toward the mount band, wherein the oil mist shield moves between a first arrangement in which the terminal end of the conical lip confronts the inner shaft in response to the outer shaft not rotating about the central axis to block the oil from the oil jet assembly from passing between the outer shaft and the inner shaft to the cavity and the outer bearing and a second arrangement in which the terminal end of the conical lip moves radially outward away from the inner shaft in response to the outer shaft rotating about the central axis to allow the oil from the oil jet assembly to pass between the outer shaft and the inner shaft to the cavity to lubricate the outer bearing.

2. The rotor assembly of claim 1, wherein the conical lip includes a mount end coupled with the mount band, the terminal end opposite the mount end, and a lip body extending therebetween, the mount end has a first axial thickness, the lip body has a second axial thickness, and the terminal end has a third axial thickness, and wherein the first axial thickness is greater than the second axial thickness, and the third axial thickness is greater than the second axial thickness.

3. The rotor assembly of claim 1, wherein the conical lip extends radially inward and axially forward from the mount band of the oil mist shield toward the inner shaft.

4. The rotor assembly of claim 1, wherein a first gap is formed between the terminal end of the conical lip and the inner shaft in response to the oil mist shield being in the first arrangement and the outer shaft not rotating and a second gap is formed between the terminal end of the conical lip and the inner shaft in response to the oil mist shield being in the second arrangement and the outer shaft rotating, and the first gap is less than the second gap.

5. The rotor assembly of claim 1, further comprising a controller configured to rotate the outer shaft about the central axis and direct the oil from the oil jet assembly toward the outer bearing and the inner bearing in response to receiving a first signal and configured to stop rotating the outer shaft and stop directing the oil from the oil jet assembly toward the outer bearing while maintaining direction of the oil toward the inner bearing in response to receiving a second signal.

6. The rotor assembly of claim 1, wherein the oil jet assembly includes an inner bearing jet extending radially inward and axially aft to direct the oil toward the inner bearing and an outer bearing jet arranged axially forward of the inner bearing jet and extending radially inward and axially forward to direct the oil toward the outer bearing.

7. The rotor assembly of claim 6, further comprising a controller configured to rotate the inner shaft about the central axis and direct the oil from the inner bearing jet toward the inner bearing in response to receiving a first signal, and wherein the controller is configured to rotate the outer shaft about the central axis and direct the oil from the outer bearing jet toward the outer bearing in response to receiving a second signal and configured to stop rotating the outer shaft and stop directing the oil from the outer bearing jet toward the outer bearing in response to receiving a third signal.

8. The rotor assembly of claim 1, further comprising a seal coupled with the inner shaft and arranged in the cavity axially forward of the outer bearing and the oil mist shield to seal an axially forward end of the cavity, and wherein the oil mist shield blocks the oil from the oil jet assembly from passing between the inner shaft and the outer shaft and into the cavity in response to the outer shaft not rotating to prevent the oil from collecting around the seal.

9. A rotor seal assembly comprising:

a first shaft extending circumferentially about an axis and configured to rotate about the axis, a second shaft arranged circumferentially around the first shaft to define a cavity radially between the first shaft and the second shaft, the second shaft configured to rotate about the axis independent of the first shaft, and an oil mist shield coupled with the second shaft and configured to move between a first arrangement in which the oil mist shield extends toward the first shaft in response to the second shaft not rotating to block oil from passing between the first shaft and the second shaft and into the cavity and a second arrangement in which the oil mist shield moves away from the first shaft in response to the second shaft rotating to allow the oil to pass between the first shaft and the second shaft and into the cavity.

10. The rotor seal assembly of claim 9, wherein the oil mist shield includes a mount band that extends circumferentially around the axis and is coupled with the second shaft and a lip that extends radially inward and axially forward away from the mount band to a terminal end of the lip that confronts the first shaft in response to the second shaft not rotating about the axis.

11. The rotor seal assembly of claim 10, wherein the lip is formed to include a plurality of slits that extend radially into the lip toward the mount band to allow the terminal end of the lip to move radially outward away from the first shaft in response to the second shaft rotating.

12. The rotor seal assembly of claim 11, wherein the lip is conical shaped.

13. The rotor seal assembly of claim 10, wherein the terminal end of the lip confronts the first shaft in response to the oil mist shield being in the first arrangement and the terminal end of the lip moves radially outward away from the first shaft and toward the second shaft in response to the oil mist shield being in the second arrangement.

14. The rotor seal assembly of claim 10, wherein a first gap is formed between the terminal end of the lip and the first shaft in response to the oil mist shield being in the first arrangement and the second shaft not rotating and a second gap is formed between the terminal end of the lip and the first shaft in response to the oil mist shield being in the second arrangement and the second shaft rotating, and wherein the first gap is less than the second gap.

15. The rotor seal assembly of claim 10, wherein the lip includes a mount end coupled with the mount band, the terminal end opposite the mount end, and a lip body extending therebetween, the mount end has a first axial thickness, the lip body has a second axial thickness, and the terminal end has a third axial thickness, and wherein the first axial thickness is greater than the second axial thickness, and the third axial thickness is greater than the second axial thickness.

16. The rotor seal assembly of claim 9, wherein the oil mist shield is located radially between the first shaft and the second shaft, and the oil mist shield extends radially inward and axially forward away from the second shaft and toward the first shaft.

17. The rotor seal assembly of claim 9, wherein the oil mist shield blocks the oil from passing between the first shaft and the second shaft and into the cavity in response to the second shaft not rotating to prevent the oil from traveling toward and collecting around a seal that is coupled with the first shaft and located axially forward of the oil mist shield.

18. The rotor seal assembly of claim 9, further comprising a controller configured to rotate the first shaft about the central axis and direct the oil toward the first shaft in response to receiving a first signal, and wherein the controller is configured to rotate the second shaft about the central axis and direct the oil toward the second shaft in response to receiving a second signal and to stop rotating the second shaft and stop directing the oil toward the second shaft in response to receiving a third signal.

19. A method comprising:

rotating a first shaft about an axis, directing oil from a first jet toward a first bearing coupled with the first shaft, blocking the oil from flowing between the first shaft and a second shaft with an oil mist shield in response to the second shaft not rotating about the axis, directing oil from a second jet toward a second bearing coupled with the second shaft in response to a first signal, and rotating the second shaft about the axis in response to the first signal to cause a terminal end of the oil mist shield to move away from the first shaft and allow the oil from the first jet and the second jet to flow between the first shaft and the second shaft to lubricate the second bearing.

20. The method of claim 19, further comprising:

stopping rotation of the second shaft about the axis in response to a second signal to cause the terminal end of the oil mist shield to move toward the first shaft and block the oil from the first jet from flowing between the first shaft and the second shaft, and stopping the direction of oil from the second jet toward the second bearing in response to the second signal.

* * * * *